United States Patent Office 3,705,037

Patented Dec. 5, 1972

3,705,037

PHOTOCHROMIC COMPOSITION CONTAINING A BLEACHED-OUT DYE AND A REDUCING AGENT THEREFOR

Eiichi Inoue and Toshihiro Yamase, Tokyo, Japan, assignors to Canon Kabushiki Kaisha, Tokyo, Japan No Drawing. Filed Mar. 20, 1970, Ser. No. 21,541
Claims priority, application Japan, Mar. 25, 1969, 44/22,577
Int. Cl. G03c *1/72*
U.S. Cl. 96—89 30 Claims

ABSTRACT OF THE DISCLOSURE

A photosensitive composition comprises a photocolor developing and eliminating coloring matter and a reducing medium capable of reducing the photocolor developing and eliminating coloring matter under irradiation of a visible light. The reducing medium may be a reducing material such as reducing solvent and reducing solid matter and a reducing organic compound.

The present invention relates to a photosensitive composition containing a compound known as coloring matter to those skilled in the art and a medium capable of reducing said compound as active components, and more in particular this invention relates to a new photosensitive composition showing photochromism based on the photooxidation-reduction induced between said active components.

As the materials showing photochromism, i.e., materials showing such a phenomenon as to change the color of material by absorbing light, a great number of compounds are known. For example there are such organic compounds as spiropiran compounds, triphenylmethane compounds, anils, semicarbazones, hydrazones, stilbene derivatives, aromatic nitro compounds, or complex compounds such as sodalite, dipyridyl chrome complex, cuprous halide, mercurous halide, titanate, mercurous dithizone or inorganic compounds such as the doped compounds like $TiO_2$ in $WO_2$, as generally known to those skilled in the art.

However, the conventional photochromic substances are usually converted from colorless state to colored state by ultraviolet ray, and these have rarely been substances presenting photochromic phenomenon by visible light.

On the other hand, the irradiation of visible light or thermal treatment is required after the irradiation of ultraviolet ray to reverse the colored state as developed by the irradiation of ultraviolet ray to the original colorless state. A photochromic substance capable of producing a color developed or eliminated state with a single radiation treatment or a single treatment has not yet been known.

In addition, most of the conventional photochromic compounds, in particular, organic photochromic compounds are obtained through special and complicated synthetic processes, and therefore there are a number of economical or practical problems in addition to the complicatedness of the technique for producing the conventional photochromic substances.

The present invention provides a photosensitive composition which is essentially different from the conventional photochromic substances, and the photosensitive composition of the present invention does not have the disadvantages observed in the conventional photochromic substances.

The first object of the present invention is to provide a photosensitive composition presenting such reversible photochromism that color is eliminated by the irradiation of visible light, and the color can be restored by removing the visible light.

Another object of the present invention is to provide photosensitive composition capable of optionally controlling the color during irradiation of visible light, and the color of the photosensitive composition before the irradiation of visible light by co-employing more than two kinds of the substances becoming effective components, or by selective employing of substances becoming effective components composing the photosensitive composition.

Another object of the present invention is to provide a photosensitive composition of great industrial value in view of economy and the simplicity of process for the production thereof because in accordance with the present invention, it is possible to use commercially available coloring matters as one of the effective components, and the other effective component is also a general chemical product and the process for producing the photosensitive composition of this invention by using said substances is very simple.

Another object of the present invention is to provide a photosensitive composition capable of being used in many fields as well as recording material by utilizing the characteristics of the photosensitive composition of this invention, or more in particular, the photocolor developing and eliminating effect or color tone charging effect caused by the irradiation of visible light.

The present invention having the above mentioned object is the photosensitive composition which is characterized by containing a photocolor developing and eliminating coloring matter and a reducing medium as effective components.

What is meant by photocolor developing and eliminating coloring matter, is a coloring matter capable of eliminating color by receiving reductive effect when excited with visible light, and what is meant by reducing medium, is a substance capable of reducing the photocolor developing and eliminating coloring matter which is present along with said reducing medium under the irradiation of visible light.

The following is an explanation of the photosensitive composition of this invention.

When visible light is irradiated on photosensitive composition of the present invention, photocolor developing and eliminating coloring matter loses color, and when the irradiation of visible light is stopped, the original color before the irradiation of visible light can be restored to present reversible photochromic effect, and when visible light is repeatedly irradiated, the faithful reproduction of said effect can be retained, and deterioration of photochromic characteristics of the photosensitive composition is not brought about.

In the following paragraphs, said reversible photochromic effect of the photosensitive composition of the present invention is explained in accordance with the most typical photosensitive composition of this invention as an example.

When visible light in the intrinsic absorption region of the photocolor developing and eliminating coloring matter is applied to the photosensitive composition composed of photocolor developing and eliminating coloring matter and a reducing medium, it is considered that the photocolor developing and eliminating coloring matter directly absorbs said light and is transferred energetically and at the same time, one or two electrons are derived from the reducing medium present around the photocolor developing and eliminating coloring matter, and the photocolor developing and eliminating coloring matter itself undergoes the molecular-structural change to be changed into colorless state.

It is supposed that the photocolor developing and eliminating coloring matter is changed to colorless state since mono-electronic reduction or di-electronic reduction reaction is brought about as a result.

On the other hand, the reducing medium itself donating electron under the irradiation of visible light is considered to be relatively subjected to oxidation in correspondence to the reaction for donating electron, i.e., reduction.

Therefore, as a whole, the elimination of color of the photocolor developing and eliminating coloring matter is caused by the photo-oxidation-reduction by means of visible light.

When visible light is removed from said photosensitive composition system, the electron moved to the photocolor developing and eliminating coloring matter is restored to the reducing medium through thermal equilibrium to the reducing medium at an appropriate speed, and it is restored to the original colored state. This is considered to be the explanation for the reversible photochromic effect of the photosensitive composition of the present invention.

In the practical embodiment of the photosensitive composition of the present invention, the speed at which the photocolor developing and eliminating coloring matter is restored into the original colored state after having cut off the visible light, the speed at which color of the photocolor developing and eliminating coloring matter is eliminated by means of visible light, and the degree of the elimination of color are varied to a great extent in accordance with the kinds of the component materials of the photosensitive composition of this invention.

In particular, according to this invention, reversible photochromic effect for presenting various apparent color changes can be expected by selecting the kind of the reducing medium.

Furthermore, in the system composed of several kinds of substances as reducing medium, reversible photochromic effect of another type can be expected.

The reducing medium can be classified into two groups, i.e., reducing medium and reducing organic compound in accordance with the construction of the photosensitive composition for the purpose of easy understanding of this invention.

Either of said two groups is the medium having reducing effect on the photocolor developing and eliminating coloring matter under the irradiation of visible light, and is such a reducing medium that, in other words, solvent itself presents the characteristic of reducing medium having said reducing activity directly, and in the simplest structure of the photosensitive composition, and is composed of photocolor developing and eliminating coloring matter and reducing medium.

On the other hand, the reducing organic compounds are the single organic compounds having the above mentioned reductivity, and the general formulation of the photosensitive composition is composed of a photocolor developing and eliminating coloring matter and a reducing organic compound and the conventional medium for carrying said photocolor developing and eliminating coloring matter and said reducing organic compound.

As mentioned above, the photosensitive composition of the present invention can be classified into two forms in accordance with the kinds of said two reducing media. In regard to the photosensitive composition in which a reducing medium is used, the embodiment for eliminating the colored state of photocolor developing and eliminating coloring matter by using visible light, or the embodiment for adjusting the color of the photocolor developing and eliminating coloring matter with several kinds of coloring matters, are the major embodiments of the present invention.

On the other hand, the photosensitive composition prepared by using a reducing organic compound can be used in various fields depending upon the kind of reductive organic compound in addition of the elimination of color or color adjustment of the photocolor developing and eliminating coloring matter as in the case in which a reducing medium is used.

As examples of the reducing organic compounds used in this invention, reducing organic compounds containing an atom having lone electron-pair, coloring materials having relatively lower oxidation-reduction potential than that of the coloring matters used as the photocolor developing and eliminating coloring matters, and coloring basic compounds having such a characteristic as is color-developed by photo-oxidation may be mentioned as compounds which can produce excellent photosensitive composition.

When the reducing organic compound is a coloring matter having lower oxidation-reduction potential than that of the photocolor developing and eliminating coloring matter, the colored state of the photosensitive composition before the irradiation of visible light is the mixture color of the two, i.e., the photocolor developing and eliminating coloring matter and coloring matter used as reducing organic compound, but when irradiated with visible light, the color of the photocolor developing and eliminating coloring matter is eliminated while the coloring matter used as the reducing organic compound retains its color, so that the resulting color is the single color of the coloring matter, when the irradiation of visible light is stopped, it restores the original mixed color. In such a way as above, the photosensitive composition presenting reversible photochromism capable of changing the color tone as well as conversion from colored state into colorless state, or from colored state into color eliminated state.

When coloring basic compound having color developing characteristic upon photo-oxidation is used as the reducing organic compound, the color of the photosensitive composition before the irradiation of visible light is that of the photocolor-developing and eliminating coloring matter, but the color of the photocolor developing and eliminating coloring matter is lost by the irridation of visible light, and on the other hand, the color of the coloring basic compound is developed by photo-oxidation, and as a whole, the color of the system is changed into the color of the color-developed coloring basic compound.

When the irradiation of visible light is cut off, the color is restored into the original color.

A perfect color conversion of such photosensitive composition can be expected by means of as above the irradiation of visible light, and the photosensitive composition gives a modified reversible photochromism.

The theoretical ground of the reversible photochromism of the photosensitive composition caused by visible light has not yet been sufficiently clarified, but there are a great number of modifications of the photosensitive composition of this invention such that a great number of materials can be used as the reducing medium in this invention.

The component materials of the photosensitive composition of the present invention, structure and modification and condition for the preparation of the photosensitive composition of this invention are explained in detail in the following to further illustrate the present invention.

(I) As the examples of the photocolor developing and eliminating coloring matters in the present invention, the following conventional dyes may be used:

(1) Methylene-Blue Color Index No. 52015, Methylene-Blue D, Color Index No. 52015, Methylene Green C, Thionine Color Index No. 52025 and such like thiazine dyes;

(2) Acridine Orange, Proflavin, Acrylflavin Color Index No. 46000 and such like acridine dyes;

(3) Rose Bengale Color Index No. 45440, Eosine Color Index No. 45380, Erythrocin Color Index No. 45430, Fluorescene Color Index No. 45350, Fluoxine Color Index No. 45405, Rhodamine B Color Index No. 45170, and such like xanthene dyes;

(4) Meldola's Blue Color Index No. 51175, Nile-Blue-A, Color Index No. 51180, and such like oxazine dyes;

(5) Riboflavin, lumichrome, and such like azine type dyes;
(6) Malachite-Green Color Index No. 42000, Fuchsine Color Index No. 42510, Methylviolet Color Index No. 42535, Crystal violet Color Index No. 42555, Ethyl violet Color Index No. 42600, Victorial Blue Color Index No. 44045 and such like triphenyl methane type dyes;
(7) Naphthol Blue Color Index No. 20470, Alizarine Yellow Color Index No. 14025, Chrysamine G, Color Index No. 22250, and such like azo dyes;
(8) Alizarine Color Index No. 58000, Alizarine Rubinol R, Color Index No. 68215, Eriochrome Grey AB Color Index No. 63615 and such like anthraquinone dyes.

(II) The following may be given as the reducing organic compounds among the reducing mediums:

Amines represented by the general formula given below:

General formula:

wherein R, R′ and R″ are the same or different and are selected from the group consisting of hydrogen, halogen, carboxyl, nitro, alkyl, substitute alkyl, aralkyl, substitute aralkyl, aryl and substitute aryl.

For example, methylamine, dimethylamine, triethylamine, ethylamine, diethylamine, triethylamine, diphenyl amine, n-propyl amine, di-n-propyl amine, tri-n-propylamine, n-butylamine, n-amylamine, n-hexylamine, laurylamine, ethylene diamine, trimethylenediamine, tetramethylene diamine, pentamethylene diamine, hexamethylene amine, ethanol amine, diethanol amine, triethanol amine, allyl amine, aniline, p-phenylenediamine, ammonia:

(2) Ethyene glycol, propylene glycol, polyethylene glycol, glycerin, trimethylene glycol and such like polyhydric alcohols:

(3) As other reducing organic compounds, a great number of compounds may be given as follows: ascorbic acid, abetic acid, allylthiourea, benzohydroquinone, N-phenyl chrysin, hydroquinone, chlorohydroquinone, bromohydroquinone, catechol, hydroxy-phenyl glycin, aminophenyl, sulfuric acid monomethylaminophenol, phenylenediamine, sulfuric acid diethylaminoaniline, sulfurous acid 4-diethylaminoaniline, sulfuric acid 4-(ethyl hydroxyethylamino)-aniline, benzene sulfinate, toluene sulfinate, naphthalene sulfinate, isoascorbic acid, benzene sulfonic acid hydrazide, toluene sulfonic acid hydrazide, naphthalene sulfonic acid hydrazide, benzoic acid hydrazide, 4-hydroxy benzoic acid hydrazide, 4-methoxy benzoic acid hydrazide, isonicotinic acid hydrazide, lauric acid hydrazide, 1-phenyl-3-pyrazolidone, 1-phenyl-5-methyl-3-pyrazolidone, thiosemicarbazide, 4-phenyl-thiosemicarbazide, 1-phenylthiosemicarbazide, 4-allyl thiosemicarbazide, semicarbazide, 4-phenylsemicarbazide, 2-hydrazino-benzoimidazole, 2-hydrazinobenzodiazole, toluenesulfonic acid-1-methyl-2-hydrazinobenzothiazolium, hydrochloric acid hydroxyl amine, phenylhydroxyl amine, oxalic acid phenyl hydroxyl amine, glycose, etc.

(B) Among the reducing organic compounds, it is possible to use coloring materials having relatively lower oxidation-reduction potential than the photocolor developing and eliminating coloring matter to be used as a component of the photosensitive composition as the reducing organic compounds.

In other words, the concrete examples of the above given photocolor developing and eliminating coloring matters may be appropriately selected in accordance with the photocolor developing and eliminating coloring matter to be practically used.

For example, among those given above, eosine, erythrosine, Rose Bengale, Eosine Yellow, or Liboflavin produces excellent results as reducing agents more often than not.

(C) As the examples of the coloring basic compounds having such a characteristic as to receive photo-oxidation among the reducing organic compounds, various kinds of Leuco bases, or carbinol bases can be given.

For example, Leucomalachite Green, Leucocrystal Violet, Michler's Hydralol, Carbinol Malachite Green, and such like Leuco bases or carbinol bases are given.

(III) Among the reducing media, the following can be given as the examples of the reducing media of the present invention.

(1) Alkaline aqueous solvent: Alkaline aqueous solvents can be prepared in accordance with the conventional methods, for example, by dissolving hydroxides of alkali metals or alkaline earth metals or the salts with weak acids in water.

The application of the alkaline aqueous solvent to the photosensitive composition is more restrictive than the above mentioned reducing organic compounds, and the reversible photochromic effect of rapid photocolor development and elimination is hardly expected, and it is necessary to prepare an appropriate alkaline aqueous solvent in accordance with the photocolor developing and eliminating coloring matter to be employed.

Relatively preferable examples of the above mentioned alkaline aqueous solvents are buffer solutions of pH 9 to 12 prepared by dissolving in water a combination of sodium hydroxide, boric acid, calcium chloride, and sodium carbonate. These buffer solutions can be used as a reducing medium.

The examples of the method for preparing the buffer solution employed in the examples of the present invention is given below:

(A) Buffer solution of pH 9: Water is added to a mixture of 21.3 ml. of 0.1 N aqueous solution of sodium hydroxide, and 50.0 ml.[1] of an aqueous solution of 0.1 mol/litre of boric acid, and 0.1 ml./litre of calcium chloride to make the amount of the whole mixture to be 100 ml. by adding water.

(B) Buffer solution of pH 10: Water is added to a mixture of 43.9 ml. of 0.1 N aqueous solution of sodium hydroxide and 50.0 ml. of an aqueous solution of 0.1 mol/litre of boric acid and 0.1 mol/litre of calcium chloride to adjust the amount of the whole mixture solution to be 100 ml. by adding water.

(C) Buffer solution of pH 11: 97.3 ml. of 0.05 N sodium carbonate (5.30 g./litre) and 2.70 ml. of 0.05 mol/litre of boric acid ($Na_2B_4O_7 \cdot 10H_2O = 19.10$ g./litre) are mixed.

(2) Basic organic solvent: As the basic organic solvent used as the reducing medium, the above mentioned reducing organic compounds in a liquid state, and capable of dissolving the photocolor developing and eliminating coloring matter to be used in this invention, can be selectively used.

On the other hand, in the photosensitive composition of the present invention, liquid basic organic compounds may be singly used as an organic solvent as a matter of course, but in particular, it has been proved through experiments that photochromism can be effectively attained by adding an appropriate amount of basic substances, such as sodium hydroxide, sodium carbonate, ammonia to said organic solvent, and therefore when an organic solvent is used along with the above mentioned basic substances, the liquid organic compounds of large polarity capable of facilitating dissolution of basic substances give preferable results.

(3) Other reducing medium: Solid media can be present as media in addition to the liquid media, but there is no preferable solid medium to be used as the reducing medium of the photosensitive composition of this invention, but some of the solid media having more or less reductivity capable of being used as the media in this invention are polyvinylpyrrolidone, polyethyleneglycol, polyvinylalcohol, etc.

[1] The aqueous solution is prepared in such a manner that 62 g. of boric acid and 7.46 g. of calcium chloride into water, and the amount of the solution is adjusted to be 1000 ml.

Generally speaking, the above given solid media can produce preferable results when they are used in the preparation of the photosensitive composition by dissolving the same in the above mentioned reducing media and thereafter the obtained solution is made into a solid photosensitive composition.

The above are the description about the components of the photosensitive composition, but in the system where a photocolor developing and eliminating coloring matter and a reducing organic compound are used as major components in this invention, said components may be dissolved in an appropriate solvent to prepare a photosensitive composition, and as examples of the solvent used in the preparation of the photosensitive composition, the following can be given:

(1) When an aqueous solvent is used, the above mentioned aqueous solvents as the reducing aqueous solvents rather than simple water, can produce remarkable reversible photochromic effect of the photosensitive composition of this invention.

Namely, when an alkaline aqueous solvent, in particular, a buffer solution having pH value ranging from 9 to 12 is used, remarkable effect can be attained, and this is a noteworthy characteristic of the present invention.

(2) When an organic solvent is used as the reducing medium, there may be employed those having excellent effect for dissolving photocolor developing and eliminating coloring matters, for example, alcohols such as methanol, ethanol, propanol, butanol, ethylene glycol, and glycerin, and solvents such as acetone, acetonitrile, dimethylformamide, dimethylsulfoxide, diethylether, and dioxane.

Further, an appropriate mixture solvent can be selected from among the mixture solvent prepared by combining the above mentioned solvents and other organic solvents.

In addition, when sodium hydroxide, sodium carbonate, ammonia and such like basic materials are appropriately added to the above given organic solvents, the photochromism by the photo-oxidation-reduction can be effectively carried out.

(3) When solid photosensitive composition is desired to be prepared, after a photocolor developing and eliminating coloring matter and a reducing medium or a photocolor developing and eliminating coloring matter, a reductive organic compound, and a solvent, are dissolved along with solid substance, the obtained mixture is used as the solid photosensitive composition.

When the solid photosensitive composition is to be prepared, transparent and film forming high polymer compound is desirable.

For example, as the high polymer compound, there may be used gelatin, polyvinyl alcohol, polyvinylpyrrolidone, and carboxymethylcellulose.

As the high polymers capable of being dissolved in an organic solvent, there may be mentioned polymethylmethacrylate, polyethylene glycol, paraffin, polyvinyl chloride, polycarbonate, polyvinyl butyral, ethyl cellulose, methyl cellulose, cellulose acetate, and nitrocellulose.

The effects of the respective compositions and the typical combinations of the photosensitive composition of this invention are explained in the following paragraphs.

The combination of the composition can be classified into the following three groups in accordance with the type of the reducing media, and each group is explained by giving typical examples below.

(A) Photocolor developing and eliminating coloring matter-reducing aqueous solvent system: Sodium hydroxide, boric acid, calcium chloride, etc., are combined in accordance with a conventional method, and the obtained mixture is dissolved in water to prepare a buffer solution having pH ranging from 9 to 12. An appropriate amount of a coloring matter is perfectly dissolved in the thus prepared buffer solution.

When a visible light corresponding to an intrinsic absorption region of the coloring matter is applied to the obtained coloring matter solution, the color of said coloring matter slowly disappears, and finally it is reduced to a colorless state. When the colorless solution is allowed to stand in a dark place by stopping the irradiation of visible light, it is gradually restored to the original colored state.

When a visible light is applied thereto again, the color is lost, and when it is placed in a dark place, it is turned back into colored solution. This color change can be repeatedly carried out to show reversible photochromism. However, this cycle of photocolor development and elimination is so slow that preferable result is not expected.

(B) Photocolor developing and eliminating source—basic organic solvent system: Coloring matter is dissolved in a reducing organic solvent, and when a visible light is projected to the obtained solution, as in the preceding case (A), the same photochromism can be obtained.

When a basic material is added to the solution, the photochromic effect can be improved.

(C) Photocolor developing and eliminating coloring matter—solid medium system: Solid medium is dissolved in a reducing solvent to disperse the coloring matter to the effect that the coloring matter can be dispersed in the solid.

Thus obtained solid has been found to show photochromism when irradiated with light in a manner similar to the preceding (A) and (B).

Next, the photosensitive composition composed of a photocolor developing and eliminating coloring matter, a reducing organic compound and a medium is classified into three groups, and are explained in accordance with the typical examples thereof.

(A) Photocolor developing and eliminating coloring matter—reducing organic compound—aqueous solvent system:

(1) Sodium hydroxide, boric acid and calcium chloride are dissolved in water in accordance with a conventional method, and a buffer solution having pH value of 9 to 12 is prepared.

Coloring matter and more than one kind of reducing organic compounds are added to the above prepared buffer solution and perfectly dissolved therein.

When the visible light of the intrinsic absorption region of the coloring matter is irradiated onto said coloring solution, the color is quickly lost, and it is reduced to colorless state. Thereafter, the visible light is removed, and the coloring solution is restored to the original colored state. The color change can be repeated over and over again, and reversible photochromism can be realized.

(2) When, as a reducing organic compound, a coloring matter is used which is different from a photocolor developing and eliminating coloring matter in point of the photo-oxidation-reduction potential, a photo-oxidation-reduction reaction is caused between the both coloring matters by a visible light, and the photocolor developing and eliminating coloring matter is reduced to erase the color while the other coloring matter used as a reducing agent is oxidized, but the color thereof is not erased. Therefore, the resulting color of the whole system is changed from the mixed color to a single color cf the coloring matter which color is not erased.

In this system, it is sufficient to apply a visible light which is absorbed by one or both of the coloring matters, but it is naturally effective to apply a light having a spectrum absorbed by both coloring matters. It is not yet clarified at the present time whether the mechanism of photo-oxidation-reduction is due to electron-transfer or due to energy transfer.

(3) When leuco base, carbinol base or such like coloring matter base capable of being turned into colored state from colorless state through photo-oxidation is used, the color of the photocolor developing and eliminating color-matter is lost as it absorbs a visible light and is reduced, and the other coloring matter base is simultaneously oxidized to develop color. Therefore, as a whole, the color of the system is changed from the color of the original photocolor developing and eliminating coloring matter to the color of the coloring matter base thus color-developed.

(4) It has been proved through experiments that when other organic reducing agents such as amines, polyhydric alcohols, are coemployed along with the systems described in the preceding paragraphs (2) and (3), the color changing rate can be increased.

Equimolar ratio is preferable in principle to adjust the mixing ratio of more than two kinds of coloring matters in carrying out photo-oxidation reduction when more than two kinds of coloring matters are used, but it is preferable to determine the mixing ratio appropriately through the relation of the respective light absorption coefficients and colors.

When other reducing agent capable of producing no color change is used, it is possible to attain preferable photochromism without lowering color changing rate.

(B) Photocolor developing and eliminating coloring matter—reducing organic compound—organic solvent system: This is the system in which organic solvent is used in place of the aqueous solution of the above mentioned aqueous solution of (A) system.

The organic solvent of coloring matter of high solubility is preferably selected. It has been found by experiments that the efficiency of photo-oxidation-reduction is further improved by adjusting the basicity and acidity of the solvent system in advance by adding sodium hydroxide, sodium carbonate, potassium hydroxide, ammonia etc. Further, the amount of reducing organic compounds added to the coloring matter is preferably added in an amount of higher than equimolar ratio.

In regard to the amount of the coloring matter to be dissolved in the solvent, from $10^{-4}$ to $10^{-1}$ mol/litre is preferable. And this is also applicable to system A. However, more or less than the above specified amount can be also used.

On the other hand, as described in regard to the systems (A)(2) and (3), when other coloring matter is used as the reducing organic compounds, the same photochromism can be obtained.

(C) Photocolor developing and eliminating coloring matter—reducing organic compounds—solid medium system: When a coloring matter and more than one kind of organic reducing agent are dispersed into the solid medium such as organic high polymer, photochromism can be effectively brought about through the irradiation of visible light.

In this case, solid medium is once dissolved into an appropriate solvent to disperse the coloring matter and the reducing organic compound.

As the solvent, water or various kinds of organic solvents can be used, but it is effective to use a mixture solvent to dissolve three components, i.e., coloring matter, reducing organic compound, and solid medium.

On the other hand, as the reducing organic compounds, a photocolor developing and eliminating coloring matter and another coloring matter of different oxidation-reduction potential are dissolved in a solid medium, photo-oxidation-reduction is brought about between the coloring matters as in the case of (A)(2), and it has been found out that the photocolor development and elimination can be effectively carried out.

In addition, when leuco compounds which are turned into coloring matters when oxidized, are used as reducing organic compounds, one coloring matter absorbs a visible light and is reduced to lose color as in the case of (A)(3), and the coloring matter such as leuco compound is oxidized simultaneously to develop color, and the same phenomenon can be observed in a solid medium.

Next, the general observation of the photosensitive composition of the present invention is given below. The photosensitive composition of this invention is composed of two factors, i.e., a photocolor developing and eliminating coloring matter and a reducing medium.

However, when the reducing medium is a carrier for the photocolor developing and eliminating coloring matter, and at the same time, it is a reducing medium working as a reducing agent, more or less restriction is accompanied upon selection of photocolor developing and eliminating coloring matter and reducing medium.

For example, the solubility of coloring matter, the difference of reversible photochromism attributable to the kind of coloring matter, or the degree of the reductivity of the reducing medium under the irradiation of visible light or such like conditions are taken into consideration, the photosensitive composition showing remarkable reversible photochromism when irradiated with visible light, should be prepared.

On the other hand, when the reducing medium is a reducing organic compound, the photosensitive composition is composed of a photocolor developing and eliminating coloring matter, a reducing organic compound and medium. Therefore, it is not requested that the reducing organic compound has various physical properties which is essential to a medium, and the reducing organic compounds can be selected under much milder conditions.

In addition, when a reducing medium is used as a medium, reversible photochromism shown by the photocolor developing and eliminating coloring matter can be further improved, and such fact is sufficiently recognized by experiments, and therefore, when the photosensitive composition of the present invention is composed by using a reducing organic compound as one of the components, the most effective result can be obtained.

The form of the photosensitive composition of the present invention may be either liquid phase or solid phase.

When employed as ordinary photosensitive material, liquid phase is accompanied with inconvenience, but the liquid is filled into appropriate capsules, and the capsules are arranged into a plate form.

On the other hand, as described before, the photosensitive composition of the present invention can be changed from colored state into colorless state, or the change of color or perfect substitution of colors can be performed, and the applications of this invention in many fields can be expected from the above mentioned photochromism.

In addition, the photosensitive composition of this invention, can be economically and easily produced by using the commercially available materials, and the industrial value of the photosensitive composition of this invention is remarkable.

The following are the examples to further illustrate the present invention, but the present invention is not restricted to the following examples.

EXAMPLE 1

The solution of $5\times10^{-4}$ M/liter methylene blue and $2\times10^{-3}$ M/liter triethanol amine was prepared by adding these agents to the buffer solution of pH 9. (The concentrations were respectively based on solvents.)

The solution was charged into a Pyrex glass cell, and was exposed to irradiation of light by using photographic flash bulb (1000 w. condensed light bulb produced by Iwasaki Electric Co., Ltd.) at a distance of 50 cm.

The solution which had been blue before irradiation changed into perfectly colorless.

When the irradiation of light was stopped, the color of the solution returned to the original color quickly (in about 5 seconds at the liquid temperature of 25° C.).

When the photochromic process was repeated more than 10 times, there was observed no fatigue in the reversibility.

EXAMPLE 2

The process of Example 1 was repeated by using triethylamine in place of triethanolamine.

The photochromism was exactly the same as that of Example 1, and almost the same result could be observed when the photochromic process was repeated.

EXAMPLE 3

The solution of $3\times10^{-4}$ M/liter Rose bengale and $1\times10^{-3}$ M/liter triethanol amine was prepared by dissolving these agents into the buffer solution of pH 9.

The solution was exposed to an irradiation of a 500 w. Xenon lamp (produced by Ushio Electric Co., Ltd.) through glass filter UV–39 (produced by Toshiba Electric Co., Ltd.) at a distance of 20 cm.

The solution which had been red before irradiation was changed into colorless perfectly within about 5 minutes.

When the irradiation was stopped, the solution returned to the original color in about 5 minutes at the liquid temperature of 25 deg. C.

The photochromic process could be repeated more than 10 times.

EXAMPLE 4

Eosine was dissolved in to the buffer solution of pH 11 to form the solution of $5\times10^{-4}$ M/liter eosine.

Ascorbic acid 3 mg., was added to 50 ml. of the solution.

Thus obtained solution was charged to a quartz glass cell and was exposed to the visible light of a 500 w. superhigh pressure mercury lamp (produced by Ushio Electric Co., Ltd.) through glass filter UV–39 at a distance of 15 cm. from the light source.

The solution which had been orange before irradiation of light, lost the color in about 10 seconds.

When the solution was held in a dark place for about 30 seconds, it returned to the original color.

EXAMPLE 5

Methylene blue was dissolved into a buffer solution pH 10, so that the concentration of methylene blue could be $3\times10^{-4}$ M/liter. Eosine was further added to the solution so that the concentration of eosine could be $2\times10^{-4}$ M/liter.

The light of a 500 w. tungsten lamp (projector lamp produced by Toshiba Electric Co., Ltd.) was radiated onto thus obtained solution, at a distance of 20 cm. from the light source.

The color of the solution was changed from blue which is a color of methylene blue, into yellow which is a color of eosine.

The color returned into the original blue in 2 to 3 seconds after the irradiation was stopped. The repeated color change was observed such that the original blue was changed into yellow by radiation of light.

EXAMPLE 6

Sodium hydroxide 100 mg. was added to 50 ml. of the solution prepared in Example 5.

Light exposure was carried out under the same conditions as in Example 5 on the above prepared solution.

The solution was changed from blue into yellow in one second, and after the removal of light source, it returned into the original blue within 2 to 3 seconds.

In reviewing the above given example, it is found that the increasing pH of the solution can accelerate photo-oxidation-reduction reaction.

EXAMPLE 7

Methylene blue was added into the buffer solution of pH 10 that the concentration of methylene blue could be $10^{-4}$ M/liter of the solution.

Thus obtained solution was charged into a quartz glass cell, and light of a 500 w. tungsten lamp (projector lamp produced by Toshiba Electric Co., Ltd.) was radiated onto the above obtained solution, at a distance of 20 cm. from the light source, and the radiation of light was carried out for about 3 hours.

The solution which had been blue before the irradiation of light, was turned into colorless. Thereafter, the solution was left out at room temperature for about 48 hours, it returned into original color.

EXAMPLE 8

Thionine was used in place of methylene blue, and the process of Example 1 was repeated.

The radiation of light was carried out under the same conditions as Example 1 for about 150 minutes.

The solution which was light purple before the radiation of light perfectly turned into colorless.

The solution was then left out in a dark place at the room temperature 25 deg. C., and the original color was restored in about 48 hours.

EXAMPLE 9

Liboflavin was used in place of methylene blue, the process of Example 1 was repeated, and light radiation was carried out under the same conditions as in Example 1 for about 60 minutes.

The solution which was yellow before radiation of light lost the color perfectly. The solution returned yellow within 36 hours.

EXAMPLE 10

Methylene blue 10 mg. was dissolved into 100 ml. of ethylene glycol, and the obtained solution was subjected to light irradiation by using a 500 w. tungsten lamp as the light source similar to in Example 1, at a distance of 20 cm. from the light source for 40 minutes.

The solution which was blue before radiation of light turned into light blue. Thereafter, the solution was left out at a room temperature for about 48 hours, and then the original color was restored.

EXAMPLE 11

5 mg. of thione and 10 mg. of triethanol amine were dissolved into 30 ml. of ethanol, and light radiation was carried out for about 180 minutes in the same manner as in Example 4.

The solution which was light purple before radiation of light perfectly lost the color, and when it was left out in a dark room at a room temperature, the original color could be restored in about 48 hours.

EXAMPLE 12

Riboflavin 10 mg. was mixed along with 3 g. of gelatin and 6 mg. of triethanol amine, and the mixture was dissolved into 20 ml. of water.

Thus the obtained solution was coated on a glass plate, and the coating was dried, and a photosensitive layer 100 microns thick was obtained.

The photosensitive layer was exposed to irradiation through an image pattern to form image (by using a photographic projector lamp 1 kw., at a distance of 30 cm.).

An exposed portion lost the color by a light radiation for 30 minutes, and a positive image of the pattern could be obtained. The image was retained for 5 hours (the temperature difference of the color developing and eliminating portion was 0.1 as calculated by photoconductive density).

EXAMPLE 13

50 mg. of meldler blue, 55 mg. of acrydine orange and 70 mg. of diphenyl amine were dissolved into 30 ml. of ethanol. On the other hand, 2 g. of polyvinylbutyral (trade name: Sekisui Elec BH–1 produce by Sekisui Chemical Co., Ltd.) was dissolved into 20 ml. of ethanol, and thus obtained polybutyral solution was mixed along with 100 mg. of potassium hydroxide, and then 30 ml.

of the above mentioned coloring solution was added thereto.

Next, thus obtained solution was applied on an art paper to form a coating about 30 microns thick. Thereby, the film form photosensitive composition could be obtained.

Visible light was radiated onto thus obtained film form composition by using a photographic bulb (1 kw. condensed light bulb manufactured by Iwasaki Electric Co., Ltd.) at distance of 50 cm., and a blue color of the composition was eliminated within about 30 seconds, and the color of the composition was changed into orange, when the radiation of visible light was stopped, bluish color was gradually restored, and the original blue color could be restored in about 30 minutes.

EXAMPLE 14

The solution of $4\times10^{-4}$ M/liter Thionine, $3\times10^{-4}$ M/liter eosine yellow and $5\times10^{-3}$ M/liter glycerine was prepared by adding these agents into the buffer solution of pH 9, and the photosensitive solution was obtained.

Thereafter, to light of xenon lamp (1 kw.) through glass filter UV–39 was exposed the obtained photosensitive solution at a distance of 20 cm., for 3 minutes. The purple color of the solution was eliminated.

The original purple color was restored in 30 seconds after exposure.

EXAMPLE 15

The system comprising methylene blue and riboflavin i.e. two coloring matters which are different from each other on photo-oxidation-reduction potential was examined on changing a ratio of the two coloring matters. The results are shown below;

Methylene blue 0.03 g. and riboflavin 0.03 g. were separately dissolved in each buffer solution 300 ml. of pH 10, and the precipitations each were removed by filtration through filter paper.

The above mentioned two solutions were mixed at the below given ratio by volume to prepare the samples.

| | Methylene blue solution | Riboflavin solution |
|---|---|---|
| Sample: | | |
| A | 5 | 5 |
| B | 10 | 5 |
| C | 1 | 5 |

Visible light was applied to the solutions, A, B, and C by using a photographic bulb (1000 w. condensed light bulb) at a distance of 20 cm. for one minute.

The samples A, B, and C changed color respectively from green which is a color of the mixture sample of the two coloring matters before the application of light into yellow which is a unique color of riboflavin.

The samples were left out in a dark place, and the respective samples retrieved a color of Methylene Blue, and green could be restored.

It was observed that the speed of the restoration of color increased as a relative ratio of methylene blue was higher.

When irradiation was applied onto the solution comprising methylene blue and no riboflavin under same condition as above, no color-change was observed.

EXAMPLE 16

Methylene Blue, Erythrocin, and triethanol were added into the buffer solution of pH 10 so that the solution of methylene blue $5\times10^{-4}$ M/liter, Erythrocin $4\times10^{-4}$ M/liter, and triethanol $2\times10^{-3}$ M/liter was prepared.

Light irradiation was applied to the solution by using a photographic flash bulb (1000 w. condensed light bulb produced by Iwasaki Electric Co., Ltd.) at a distance of 30 cm.

The solution lost a blue color of methylene blue, and changed from a purple color as a color of the solution into red in about 3 seconds, and when the light source was removed, the original purple color was restored in 10 seconds.

EXAMPLE 17

Thionine, Eosine Yellow and triethanol amine were dissolved into the buffer solution of pH 10 so that the solution of thionine $6\times10^{-4}$ M/liter, Eosine Yellow $3\times10^{-4}$ M/liter and triethanol amine $2\times10^{-3}$ M/liter was prepared.

Thus obtained solution was exposed to irradiation of light by using a photographic flash bulb (1000 w. condensed light bulb produced by Iwasaki Electric Co., Ltd.) at a distance of 20 cm. for one minute.

A purple color of the solution was prefectly eliminated in about 10 seconds. After the removal of the light source, the original purple color was restored in about 20 seconds.

EXAMPLE 18

Rose bengale, and triethanol amine were dissolved into ethylene glycol so that the solution of Rose bengale $5\times10^{-4}$ M/liter and triethanol amine $2\times10^{-3}$ M/liter was prepared.

0.3 gr. of potassium hydroxide was added to 50 ml. of the solution, and the solution was sufficiently agitated.

Light irradiation was applied to the solution by using a 500 w. xenon lamp and glass filter UV–39 at a distance of 30 cm.

The solution lost a red color of Rose bengale in about one minute. When the solution was placed in a dark place, the original color thereof was restored slowly, and within about 5 minutes, the original red color could be perfectly restored.

EXAMPLE 19

Proflavine and leuco-malackite green were dissolved into ethanol so that the solution of Proflavine $1\times10^{-3}$ M/liter and Leucomalackite Green $2\times10^{-3}$ M/liter was prepared.

Thus obtained solution was charged into Pyrex glass cell and light irradiation was applied to the solution by using a photographic bulb (1000 w. condensed light bulb produced by Iwasaki Electric Co., Ltd.) at a distance of 50 cm.

The proflavine of the solution was reduced, and a yellow color thereof was eliminated to be decolored, and on the other hand, leuco-malackite green was oxidized to bear green.

In 10 minutes after the irradiation of light, a photostationary state was observed. The yellowish green color which is a mixed color of the two coloring matters was observed in the solution.

When the irradiation of light was stopped, the original yellow color which is the color of Proflavine was restored in 30 minutes.

EXAMPLE 20

Rose bengale, and riboflavine were dissolved into ethanol so that the solution of Rose bengale $5\times10^{-3}$ M/liter, and riboflavine $3\times10^{-3}$ M/liter was prepared.

Thus obtained solution was charged into a quartz glass cell, and visible light irradiation was applied to the solution by using a superhigh pressure mercury lamp (produced by Ushio Electric Co., Ltd.) through glass filter UV–39 (produced by Toshiba Electric Co., Ltd.) at a distance of 15 cm.

A red color of Rose bengale was eliminated by the irradiation of light for 20 seconds, and the solution was changed into light yellow color.

When the solution was left out in a dark place for two minutes, and the color thereof turned into yellow.

Light irradiation was applied again for one minute to the solution, and the dark yellow color of the solution was changed into light yellow state.

It is to be understood that the photo reduction of Rose bengale was initially carried out, and secondly the photo-reduction of riboflavine was carried out in such color transformation.

When the solution of light yellow color was placed in a dark place, the original red color of the solution was perfectly restored within about 24 hours.

The above mentioned process couuld be repeated.

EXAMPLE 21

Water 30 ml. was added into 3 g. of powder gelatin (produced by Wako Reagent Co., Ltd.) and then the mixture was heated in a hot water bath.

The below shown compositions were added to the above prepared solution, and the mixture was sufficiently stirred.

| | Mg. |
|---|---|
| Sodium hydroxide | 100 |
| Boric acid | 150 |
| Potassium chloride | 200 |
| Methylene blue | 35 |
| Acridine orange | 50 |
| Triethanol amine | 100 |

When the solution reached to sufficient homogeneity, the solution was applied to form coating on a smooth plane glass and the coating was dried, and film form composition was prepared. (The coating was dried in dark room in atmosphere at about 25° C.).

Thus obtained film form composition was subjected to irradiation of light by using a photographic bulb (a 1000 w. condensed light bulb produced by Iwasaki Electric Co., Ltd.) at a distance of 50 cm.

The blue color of Methylene blue was lost in about 10 seconds, and the color was changed into orange.

When the irradiation of light was stopped, the original blue color was gradually recovered. The original blue color of the composition was restored in about 10 minutes. (At 23° C. of temperature).

EXAMPLE 22

Polyvinyl alcohol (manufactured by Tokyo Kasei Co.; degree of polymerization thereof; 1700) 2 g. was added to 20 ml. of water, and was sufficiently dissolved in heating in a hot water bath.

| | Mg. |
|---|---|
| Potassium hydroxide | 100 |
| Methylene blue | 20 |
| Eosine yellow | 30 |

The above shown agents were added to the above prepared solution, and the mixture was sufficiently stirred till uniform mixture solution could be obtained.

The obtained solution was applied to form coating on a smooth glass plate, and it was dried into film form composition.

Thus obtained film presented blue color.

Thus obtained film was subjected to light irradiation by using a 500 w. tungsten lamp (a projector lamp produced by Toshiba Electric Co., Ltd.).

In about 5 seconds, the blue color of the film was lost, and the color was changed into yellow which is a color of Eosine Yellow. A color of Methylene blue was eliminated. The original blue color was restored in about 15 minutes.

The process could be repeated, and no fatigue was observed in the photocolor developing and eliminating reaction.

What is claimed is:

1. Photochromic composition which comprises a colored photocolor developing and eliminating coloring matter and a reducing medium capable of producing a reducing effect on said photocolor developing and eliminating coloring matter under the irradiation of a visible light resulting in a reversible elimination of color and a colorless state wherein said photocolor developing and eliminating coloring matter is at least one member selected from the group consisting of thiazine dyes, acridine dyes, xanthene dyes, triphenyl methane dyes, azo dyes, and anthraquinone dyes.

2. Photochromic composition according to claim 1 wherein the reducing medium is a reducing material carrying the photocolor-developing and eliminating coloring matter.

3. Photochromic composition according to claim 2, wherein the reducing material is a reducing solvent.

4. Photochromic composition according to claim 3, wherein the reducing solvent is a reducing aqueous solvent.

5. Photochromic composition according to claim 4, wherein the reducing aqueous solvent is an alkaline buffer solution.

6. Photochromic composition according to claim 5, wherein the reducing aqueous solvent has a pH ranging from 9 to 12.

7. Photochromic composition according to claim 4, wherein the reducing solvent is a basic organic solvent.

8. Photochromic composition according to claim 7, wherein the basic organic solvent is a liquid organic compound represented by the general formula:

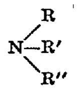

wherein R, R′ and R″ are the same or different and selected from the group consisting of hydrogen, halogen, carboxy, nitro, alkyl, substituted alkyl, aralkyl, substituted aralkyl, aryl and substituted aryl, and having a solubility capable of carrying the photocolor developing and eliminating coloring matter to be used.

9. Photochromic composition according to claim 8, wherein the basic organic solvent is a liquid polyhydric alcohol having a solubility capable of carrying the photocolor developing and eliminating coloring matter.

10. Photochromic composition according to claim 4, wherein the reducing solvent is the mixture prepared by adding a basic compound to the basic organic solvent.

11. Photochromic composition according to claim 1 wherein the reducing medium is a reducing organic compound.

12. Photochromic composition according to claim 11, wherein the reducing organic compound contains an atom having a lone electron pair.

13. Photochromic composition according to claim 12 wherein the organic compound having a lone electron pair is a compound represented by the formula:

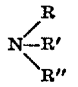

wherein R, R′ and R″ are the same or different and selected from the group consisting of hydrogen, halogen, carboxyl, nitro, alkyl, substituted alkyl, aralkyl, substituted aralkyl, aryl and substituted aryl.

14. Photochromic composition according to claim 13 wherein the organic compound having a lone electron pair is polyhydric alcohol.

15. Photochromic composition according to claim 12 wherein the reducing organic compound is a coloring matter having relatively lower oxidation-reduction potential than that of the coloring matter to be used as a photocolor developing and eliminating coloring matter.

16. Photochromic composition according to claim 12 wherein the reducing organic compound is a coloring basic compound having such a property as to develop a color when subjected to photo-oxidation.

17. Photochromic composition according to claim 16 wherein the coloring basic compound is Leuco dye base.

18. Photochromic composition according to claim 17 wherein the coloring basic compound is a carbinol dye base.

19. Photochromic composition according to claim 12 wherein the reducing organic compound is a combination of a reducing organic compound having a lone electron pair, and a coloring matter having relatively lower oxidation reduction potential than that of the coloring matter to be used as the photocolor developing and eliminating coloring matter.

20. Photochromic composition according to claim 12 wherein said reductive organic compound is a combination of a reducing organic compound having a lone electron pair, and the coloring basic compound having such a property as to develop color when subjected to photooxidation.

21. Photochromic composition which comprises a colored photocolor developing and eliminating coloring matter, a reducing organic compound capable of producing a reducing effect on the photocolor developing and eliminating coloring matter under the irradiation of a visible light resulting in a reversible elimination of color and a colorless state and a reducing material capable of carrying the reducing organic compound and the photocolor developing and eliminating coloring matter wherein said photocolor developing and eliminating coloring matter is at least one member selected from the group consisting of thiazine dyes, acridine dyes, xanthene dyes, triphenyl methane dyes, azo dyes, and anthraquinone dyes.

22. Photochromic composition according to claim 21 wherein the reducing material is an alkaline aqueous solvent.

23. Photochromic composition according to claim 22 wherein the alkaline aqueous solvent is an aqueous buffer solution having a pH ranging from 9 to 12.

24. Photochromic composition according to claim 22 wherein the reducing material is a basic organic solvent.

25. Photochromic composition according to claim 24 wherein the basic organic solvent is an organic compound represented by the formula:

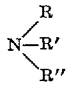

wherein R, R' and R'' are the same or different and selected from the group consisting of hydrogen, halogen, carboxyl, nitro, alkyl, substituted alkyl, aralkyl, subtituted aralkyl, aryl and substituted aryl, and having a solubility capable of carrying the photocolor developing and eliminating coloring matter and the reducing organic compound.

26. Photochromic composition according to claim 25 wherein the basic organic solvent is a polyhydric alcohol having solubility capable of carrying the photocolor developing and eliminating coloring matter and the reducing organic compound.

27. Photochromic composition according to claim 22 wherein the reducing material is a mixture prepared by adding a basic compound to a basic organic solvent.

28. A solid photochromic composition characterized by comprising a colored photocolor developing and eliminating coloring matter a reducing solvent capable of producing a reducing effect on the photocolor developing and eliminating coloring matter under the irradiation of visible light resulting in a reversible elimination of color and a colorless state and also capable of carrying the photocolor developing and eliminating coloring matter, and a solid medium wherein said photocolor developing and eliminating coloring matter is at least one member selected from the group consisting of thiazine dyes, acridine dyes, xanthene dyes, triphenyl methane dyes, azo dyes, and anthraquinone dyes.

29. Photochromic composition which comprises a colored photocolor developing and eliminating coloring matter, a reducing organic compound capable of producing a reducing effect on the photocolor developing and eliminating color matter under the irradiation of visible light resulting in a reversible elimination of color and a colorless state and a solid medium, wherein said photocolor developing and eliminating coloring matter is at least one member selected from the group consisting of thiazine dyes, acridine dyes, xanthene dyes, triphenyl methane dyes, azo dyes and anthraqoinone dyes.

30. Photochromic composition which comprises a colored photocolor developing and eliminating coloring matter, a reducing organic compound capable of working a reducing effect on the photocolor developing and eliminating coloring matter under the irradiation of visible light, and a reducing solvent capable of working a reducing effect on the photocolor developing and eliminating coloring matter under the irradiation of visible light resulting in a reversible elimination of color and a colorless state and a solid medium wherein said photocolor developing and eliminating coloring matter is at least one member selected from the group consisting of thiazine dyes, acridine dyes, xanthene dyes, triphenyl methane dyes, azo dyes, and anthraquinone dyes.

References Cited

UNITED STATES PATENTS

| | | | |
|---|---|---|---|
| 1,880,572 | 10/1932 | Wendt et al. | 96—89 |
| 2,328,166 | 8/1943 | Polgar | 96—89 |
| 2,319,344 | 5/1943 | Polgar et al. | 96—89 |
| 2,054,390 | 9/1936 | Rust et al. | 96—89 |
| 2,145,960 | 2/1939 | Wheatly et al. | 96—89 |
| 1,871,830 | 8/1932 | Wendt et al. | 96—89 |

OTHER REFERENCES

Oster et al.: "Photoreduction of Triphenylmethane Dyes in Bound State" in Journal American Chemical Society, vol. 79 (1957) p. 294.

Millich et al.: "Photoreduction of Acridine Dyes" in Journal American Chemical Society, vol. 81 (1959), p. 1357.

NORMAN G. TORCHIN, Primary Examiner

W. H. LOUIE, Jr., Assistant Examiner

U.S. Cl. X.R.

252—300